United States Patent Office 2,793,200
Patented May 21, 1957

2,793,200

CROSS-LINKING OF POLYMERS OF FLUORO-OLEFINS WITH AMINES

Fred William West, Ridgefield, N. J., assignor to The M. W. Kellogg Company, Jersey City, N. J., a corporation of Delaware No Drawing. Application August 3, 1953,
Serial No. 372,159

14 Claims. (Cl. 260—87.7)

This invention relates to the cross-linking of polymers and, more particularly, to the modification of the characteristics of chain saturated polymers containing halogen substituents on the carbon atoms.

Chain polymers are thermoplastic in nature. They exhibit continuous flow under the influence of heat and pressure. Such polymers can be resoftened as often as desired and are usually soluble in selected solvents.

Cross-linked or space polymers, on the other hand, are generally thermosetting, that is to say that they cannot be softened without decomposition once they have hardened and that they are insoluble in all solvents. A chain polymer may, however, contain a small number of cross-linkages without completely losing its thermoplastic properties.

It is often desirable to convert chain to space polymers. This is done when it is desired to decrease solubility and thermoplastic flow and, in the case of chain elastomers, where it is desired to obtain a harder, tougher product. The cross-linking of elastomers is commonly referred to as vulcanization.

The nature of the cross-linking agent will vary with the nature of the chain polymer and with the nature of the cross-link desired. There are a number of reactions which may result in the cross-linking of a chain polymer. In some reactions the cross-linking agent will take part so that at least a portion of it forms the cross-link and appears in the final cross-linked molecule. In other reactions the cross-linking agent acts solely as an activator and does not appear in the final molecule.

The chemistry of cross-linking is imperfectly understood. Cross-linking agents successful with one type of chain polymer are often ineffective with another type. There appears to be no rule for predicting with accuracy whether or not a particular cross-linking agent effective with one type of chain polymer will be effective with another type. In fact, the term "cross-linking agent," itself, covers materials which are chemically and physically dissimilar and have in common the sole characteristic that each is effective for the cross-linking of at least one chain polymer.

Among the most useful of the thermoplastic resins are those prepared by the polymerization of highly halogenated mono-olefins and particularly those prepared from highly halogenated ethylenes. Among the resins prepared by the polymerization of such substituted mono-olefins are the homo and copolymers of 2-chloro-perfluoropropylene, chlorotrifluoroethylene, bromotrifluoroethylene, trifluoroethylene, chlorofluoroethylene and vinylidene chloride.

Many of these thermoplastic polymers have unique and valuable properties. In some cases, it may be desired to retain these unique and valuable properties while at the same time decreasing thermoplastic flow and solubility by cross-linking. In the past, it has been difficult to cross-link polymers of this type satisfactorily.

It is an object of this invention to cross-link highly halogenated chain saturated polymers.

It is a further object of this invention to cross-link chain polymers prepared by the polymerization of highly halogenated mono-olefins.

It is a further object of this invention to cross-link chain polymers containing the recurring unit —CYZ— wherein Y and Z are selected from the group consisting of the halogens and hydrogen, of which no more than one is hydrogen and no more than one is fluorine, said units being in chains which are at least half halogenated. The term "at least half halogenated" as used herein is intended to mean substitution by halogen atoms at at least half of the possible positions for such substitution.

It is a further object of this invention to convert thermoplastic chain polymers produced by the polymerization of highly halogenated mono-olefins to thermo-setting space polymers of reduced solubility and thermoplastic flow.

It is a further object of this invention to convert the thermoplastic homopolymer of chlorotrifluoroethylene to an insoluble and infusible space polymer.

It is a further object of this invention to convert chain elastomers, produced by copolymerization of halogen-containing mono-olefins into soft vulcanizates of increased strength but unreduced or even superior extensibility.

A still further object of this invention is to vulcanize the rubbery copolymers of chlorotrifluoroethylene and vinylidene fluoride.

Other objects will appear hereinafter.

These and other objects are accomplished by the following invention. Chain saturated polymers which are highly halogenated are reacted with polyfunctional organic compounds containing at least two amino groups which are primary or secondary to produce organic linkages between the polymer chains. Ordinarily, diamines are used, each of the amino groups linking to a chain and resulting in an organic linkage between two chains. If desired, however, organic compounds containing more than two amino groups may be used.

The chain saturated polymers which may be cross-linked in accordance with this invention are those which are produced by the polymerization of highly halogenated mono-olefins and, in particular, those polymers which are at least half halogenated. It is necessary that halogenated carbon atoms be present in the molecular chain but it is preferable that —CF$_2$—, because of its stability, should not be the sole halogenated recurring unit. In other words, the homopolymers of tetrafluoroethylene, perfluoropropylene and vinylidene fluoride and their copolymers with each other are difficult to link by reaction with amines. In general, it may be said that the preferred halogenated chain polymers which can be linked by the method of the present invention are those which contain the recurring unit —CYZ— wherein Y and Z are selected from the group consisting of halogens and hydrogen and of which no more than one is hydrogen and no more than one is fluorine, the chain polymers being at least half halogenated.

Among the chain saturated polymers which may be cross-linked in accordance with this invention are the homo and copolymers of 2-chloroperfluoropropylene, chlorotrifluoroethylene, bromotrifluoroethylene, dichloro-difluoroethylene (asym.), trifluoroethylene, chlorofluoroethylene and vinylidene chloride. These olefins may be copolymerized with each other in groups of two or more and in any proportions. They may also be copolymerized with other olefinic compounds such as ethylene, vinylidene fluoride, tetrafluoroethylene and perfluoropropylene. Olefinic compounds with other functional groups, such as acrylic acid, acrylonitrile and their halogen substituents, may be used as copolymers with the aforementioned halo-olefins.

In particular, the method of this invention is adapted to the cross-linking of chain polymers produced by the polymerization of perfluorochloroethylenes and perfluorobromoethylenes.

One of the most useful of the perfluorochlorethylene polymers is the polymer of chlorotrifluoroethylene. This particular polymer has now been developed to a stage in which it is commercially available and has many useful applications by reason of its chemical inertness and high physical strength and resilience, when in the form of a plastic. Four-fifths of the weight of polychlorotrifluoroethylene is made up of fluorine and chlorine. The plastic form of polychlorotrifluoroethylene is colorless and transparent and has a high chemical stability with no effect being observed on the polymer after prolonged exposure to hydrofluoric acid, hydrochloric acid and strong caustic solutions, as well as concentrated sulfuric acid, fuming nitric acid, aqua regia and other vigorous oxidizing materials. The plastic form of this polymer exhibits flexibility and resilience and is not affected by water, or by humidity and, in general, is an efficient insulating material.

Normally solid plastic polymers of chlorotrifluoroethylene may be prepared by polymerizing the monomer in the presence of a suitable organic peroxide such as bis-trichloroacetyl peroxide, as the polymerizing agent, at a temperature between about —20° C. and about 25° C., preferably at a temperature of about —16° C. At a temperature of —16° C. the polymerization of chlorotrifluoroethylene to a satisfactory yield of solid polymer is accomplished in about seven days. At elevated temperatures and at corresponding superatmospheric pressures, less time is required to complete the polymerization.

The chlorotrifluoroethylene polymers may be converted by the method of this invention to insoluble and infusible space polymers, which retain, for the most part, the desirable chemical inertness and physical strength of the plastic.

Perfluorochloroethylenes, and particularly chlorotrifluoroethylene, may be copolymerized with fluoroethylenes to produce rubber-like polymers displaying elastomeric properties, high tensile strength and flexibility at relatively low temperatures. These copolymers, and particularly the copolymers of chlorotrifluoroethylene and vinylidene fluoride, possess the above-mentioned physical properties and also show a high degree of chemical inertness. They are also relatively easily soluble in various solvents and vehicles prior to cross-linking.

The preferred proportions of the monomers chlorotrifluoroethylene and vinylidene fluoride for rubbery characteristics ranges from 20 to 69 mol percent of chlorotrifluoroethylene and, most preferably, from 25 to 50 mol percent.

The copolymerization reaction may be carried out in either a water suspension type system or in a mass polymerization system. In the former system the reaction is preferably carried out at a temperature between about 0° C. and about 35° C. In a mass polymerization system the reaction is preferably carried out at a temperature between about —20° C. and about 0° C. With the water suspension type system a redox catalyst system is preferred. It has no emulsifier and contains an oxidant, a reductant and a variable valence metal salt. The oxidant in the water suspension type recipe is preferably an inorganic persulfate, such as potassium persulfate, sodium persulfate or ammonium persulfate, the latter being most desirable. The reductant is preferably a bisulfite, such as sodium bisulfite or potassium bisulfite, and preferably the former. The variable valence metal salt which is employed for the purpose of regenerating the oxidant is preferably in the form of an iron salt, such as ferrous sulfate or ferrous nitrate with ferrous sulfate being the most desirable variable valence metal salt.

In the mass polymerization system, organic peroxide promoters, and particularly halogen-substituted acyl peroxides are used. Trichloroacetyl peroxide is a preferred promoter of this type. Other halogen substituted organic peroxides suitable for carrying out the polymerization are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

By the method of this invention these rubber copolymers may be transformed into soft vulcanizates of increased strength and toughness, of decreased solubility and of the same or increased extensibility.

The polyfunctional amino compounds which are used as linking agents in accordance with the present invention are those containing at least two amino groups which are primary or secondary. The amino groups may be linked to any polyfunctional organic radical, either open chain or cyclic. Aliphatic primary diamines are preferred.

In general, the amino compounds used as linking agents in this invention may be designated as having the formula

linkages, wherein R is a polyfunctional organic radical, A is a member of the group consisting of hydrogen and monofunctional organic radicals and $n$ is an integer of at least 2. Secondary amines are considerably less reactive than primary amines.

Among the specific amino compounds which may be used are ethylene diamine, diethylene triamine, triethylene tetramine, tetraethylene pentamine, hexamethylene diamine, piperazine, 1,5-naphthalene diamine, diaminoanisole, diaminobenzoic acid (all isomers), diamino stilbene (all isomers), diaminotriphenylmethane, triaminotriphenylmethane, diaminophenol (all isomers), tetramino 3,3-dimethyl-diphenyl-methane, diaminobenzene (all isomers), triaminobenzene (all isomers), triaminobenzoic acid (all isomers), triaminophenol, 1,2-propylenediamine, 1,2,3-triaminopropane, etc.

While it is not desired to be bound by any particular theory of operation, it is believed that hydrogen-containing amino groups are effective as linking agents with the aforesaid halogen-containing chain polymers in that the hydrogen of the amino group and a halogen bonded to a carbon atom of the polymer chain combine to condense out a hydrogen halide molecule and thereby permit the nitrogen of the amino group to be bonded directly to the carbon atom from which the halogen has been removed. With a polyamine, more than one such linkage takes place on the molecule of the linking agent and thereby links one polymer chain to another.

Since hydrogen halide is evolved in the reaction, the linking proceeds most favorably when hydrogen halide is removed. To some extent, and particularly when cross-linking thin polymer sections, the hydrogen halide may be volatilized off at the temperatures used in the cross-linking reaction. In general, however, it is desirable to neutralize the hydrogen halide by the addition of excess amine, which acts as a base, or by the addition of an inorganic basic compound, such as lead oxide, magnesium oxide or zinc oxide.

The cross-linking reaction may require or may produce materials which would have an adverse effect on the properties of the cross-linked polymer. For example, the metallic halides produced by the reaction of inorganic basic compounds with hydrogen halide might reduce the chemical inertness and electrical resistance of the polymer. However, since relatively few cross-linkages are required to produce a substantial alteration in the characteristics of the polymer, relatively small amounts of linking agents and associated reagents are required. In producing a cross-linked polymer for special processes where a high degree of chemical inertness or electrical resistance is required, conditions may be controlled so that a minimum of undesired material remains in the polymer.

There are several methods of reacting the chain polymers with the amine cross-linking agents, depending on the character of the chain polymer and upon the use intended for the cross-linked polymer. When the polymer has rubbery characteristics or when it is soft enough to be mechanically worked, either with or without plasticizers, it is often desirable to incorporate the cross-linking agent by mechanical mixing. Such mechanical mixing involves shearing forces and is carried out in equipment such as 2-roll mills, Banbury (internal) mixers and screw-type plasticators, similar to extruders. Somewhat elevated temperatures of the order of from about 50° to about 100° C. ordinarily prevail in the mixing operation due to the mixing action itself and to the exothermic nature of the linking reaction. Articles to be molded are then heated in the mold with additional heat, as by hot air, steam or hot press platents, thereby shaping and cross-linking simultaneously. The temperature in the mold may range from about 100° to about 250° C.

Since mechanical mixing generates heat and since it is difficult to blend other materials into a cross-linked polymer, it is usually desirable to blend other materials into the polymer first and then add the linking agent last, just before fabrication. Among the other materials which might be added to the aforesaid polymers prior to cross-linking are fillers, pigments and plasticizers.

With certain polymers and for certain uses, particularly for coatings, polymers may be cross-linked after being deposited from solution. The polymer and linking agent are dissolved in a suitable solvent, the solution is applied to a surface, such as a fabric or a metal, and then the coating is dried and heated to cross-link the polymer. In some cases, the coating is adherent and in other cases, it may be stripped off to form a self-supporting film of cross-linked polymer.

Still another method of cross-linking a chain polymer involves the use of a milky emulsion or "latex." As stated above, the copolymerization product of chlorotrifluoroethylene and vinylidene fluoride may be prepared in a water suspension type system. In such a system the product is removed from the reactors as a latex. For most purposes, the dry rubbery copolymer is recovered by coagulation of the latex with salts and acids followed by washing and drying. But for other purposes, such as dip coating and spraying, the latex can be used directly. In these cases, the other ingredients (fillers, amine cross-linking agents, etc.) are dispersed in water containing a surface-active agent, and these dispersions are blended with the latex. The latex is then applied as a coating to a surface (similar to the solutions disclosed above) and the polymer is cross-linked as the latex is dried and heated.

Still another method of reacting the chain polymer with an amine cross-linking agent involves the reaction of the amine with the polymer in its finished, fabricated state. Since this method involves penetration of the polymer by the reactant amines, it is adaptable primarily to very thin sections of polymer such as in coatings or in self-supporting films. The coating or film is maintained in contact with the amine cross-linking agent, at elevated temperatures and preferably under pressure, for a period of time ranging from a few seconds to several days. This results in the changing of the characteristics of the chain polymer to those of a space polymer.

*Example 1*

A sample of the powdered homopolymer of chlorotrifluoroethylene, having a no strength temperature of 327° C., was heated in a sealed test tube in a 20% aqueous solution of ethylene diamine. After four days, the heating was stopped and the polymer removed from the test tube. The polymer was found to be insoluble in 1,1,3-trifluoropentachloropropane, which is ordinarily a good solvent for the homopolymer at elevated temperatures. The treated polymer did not fuse when maintained at a temperature of 260° C., whereas the untreated polymer ordinarily fuses when heated at this temperature.

*Example 2*

A 6-inch length of silver plated, stranded copper wire having an extruded coating of transparent, colorless homopolymer of chlorotrifluoroethylene, having a no strength temperature of about 220° C. was heated in a sealed test tube with a 20% aqueous solution of ethylene diamine at a temperature of 150° C. After four hours the heating was stopped and the wire removed. The insulation had become insoluble in 1,1,3-trifluoropentachloropropane when tested for eleven hours in a bath at 130° C.

*Example 3*

In the cures tabulated below, an equimolar rubbery copolymer of chlorotrifluoroethylene and vinylidene fluoride is banded on a cool mill. Zinc oxide, 5 parts by weight per 100 parts of copolymer, is then added and blended into the copolymer. The amine is then dispersed into the rubbery matrix on the mill and blended by thoroughly milling and then sheeted for pressing. The sheets are pressed between hot platens in a mold measuring 6" x 6" x 0.078" at 260° F. and 200 p. s. i. for a period of one hour. The sheets are then cured in an oven at a temperature and for a period as tabulated below:

| Amine | Proportion [1] | Oven Cure | Tensile Stress (p. s. i.) | Elongation (percent) |
|---|---|---|---|---|
| Tetraethylenepentamine. | 3 | none | 345 / 600 | 300 / 625 |
|  |  | 16 hrs. at 212° F | 330 / 910 | 300 / 600 |
| Do | 6 | none | 530 / 1280 | 300 / 600 |
|  |  | 16 hrs. at 212° F | 990 / 1800 | 300 / [2] 450 |
| Triethylenetetramine | 3 | none | 225 / 600 | 300 / 600 |
|  |  | 16 hrs. at 212° F | 360 / 1020 | 300 / 625 |
| Hexamethylene diamine. | 3 | none | 615 / 925 | 300 / [2] 450 |
|  |  | 1 hr. at 300° F | 650 / 960 | 300 / [2] 450 |

[1] In parts by weight per 100 parts of copolymer.
[2] Specimen ruptured.

The cross-linked halogenated polymers prepared by this invention may be used for most of the purposes for which the chain halogenated polymers have been used. The only important exceptions are that they cannot be molded and cannot be put into solution after cross-linking. In a practical sense, however, in most cases, the cross-linking step can be performed as the final step in fabrication and thereby make subsequent solution or molding unnecessary.

Molded articles can be made as described above by heating and compressing a mixture of the chain polymer and the cross-linking agent in a mold. The articles thus produced have all of the advantages of chemical inertness of the chain halogenated polymer, at the same time having greater toughness and better heat stability.

Films of cross-linked halogenated polymers, formed in situ, may be used for the protection of metallic surfaces against corrosive conditions. Such films have substantially the same chemical inertness as the films of chain polymer, but greater toughness and better heat resistance.

Self-supporting films of cross-linked polymer can also be advantageously made. In the case of rubbery copolymers, cross-linking produces vulcanizates of increased strength but unreduced or even superior extensibility.

The cross-linked polymers of this invention can also be used as wire coatings since the advantageous electrical properties of the halogenated polymers are only slightly reduced in cross-linking by the production of product materials.

The cross-linked polymers of this invention may also be used as impregnates and/or as coatings for yarns and fabrics, including the yarns and fabrics of asbestos, glass, synthetic resins, and natural fibers.

I claim:
1. A cross-linked halogenated polymer of perfluorochloroethylene selected from the group consisting of the homopolymers of perfluorochloroethylenes and copolymers of perfluorochloroethylenes with fluoroethylenes, said polymer containing saturated halogenated carbon chains cross-linked by an amine compound of the group consisting of polyalkylene polyamines having at least two primary amino groups and having up to eight carbon atoms, piperazine, 1,5-naphthalene diamine, diaminoanisole, diaminobenzoic acid, diamino stilbene, diaminotriphenylmethane, triaminotriphenylmethane, diaminophenol, tetramino - 3,3 - dimethyl - diphenyl - methane, diaminobenzene, triaminobenzene, triaminobenzoic acid, triaminophenol, 1,2 - propylenediamine, 1,2,3 - triaminopropane.

2. A cross-linked halogenated polymer of perfluorochloroethylene selected from the group consisting of homopolymers of perfluorocholoroethylenes and copolymers of perfluorochloroethylenes with fluoroethylenes, said polymers containing saturated halogenated carbon chains cross-linked by a polyalkylene polyamine having at least two primary amino groups and having up to eight carbon atoms.

3. The cross-linked polymer of claim 2 wherein said polyalkylene polyamine is triethylenetetramine.

4. The cross-linked polymer of claim 2 wherein said polyakylene polyamine is hexamethylenediamine.

5. The cross-linked polymer of claim 2 wherein said polyakylene polyamine is tetraethylenepentamine.

6. The cross-linked polymer of claim 2 wherein said polymer is a homopolymer of chlorotrifluoroethylene.

7. The cross-linked polymer of claim 2 wherein said polymer is a copolymer of chlorotrifluoroethylene and vinylidene fluoride.

8. A method of cross-linking a chain halogenated polymer of a perfluorochloroethylene selected from the group consisting of homopolymers of perfluorochloroethylenes with fluoroethylenes which comprises reacting said polymer in the presence of an amino compound linking agent of the group consisting of polyalkylene polyamine having at least two primary amino groups and having up to eight carbon atoms, piperazine, 1,5-naphthalene diamine, diaminoanisole, diaminobenzoic acid, diamino stilbene, diaminotriphenylmethane, triaminotriphenylmethane, diaminophenol, tetramino - 3,3 - dimethyl - diphenylmethane, diaminobenzene, triaminobenzene, triaminobenzoic acid, triaminophenol, 1,2 - propylenediamine, 1,2,3-triaminopropane.

9. The method of claim 8 wherein the polymer is a homopolymer of chlorotrifluoroethylene.

10. The method of claim 8 wherein the polymer is a copolymer of chlorotrifluoroethylene and vinylidene fluoride.

11. The method of cross-linking a chain halogenated polymer of a perfluorochloroethylene selected from the group consisting of homopolymers of perfluorochloroethylenes and copolymers of perfluorochloroethylenes with fluoroethylenes which comprises reacting said polymer in the presence of a polyalkylene polyamine having at least two primary amino groups and having up to eight carbon atoms.

12. A method of cross-linking a copolymer of chlorotrifluoroethylene with vinylidene fluoride which comprises reacting said polymer with hexamethylenediamine.

13. The method of claim 11 wherein the reaction is carried out in the presence of an inorganic basic compound of zinc oxide, lead oxide and magnesium oxide.

14. The method of claim 12 wherein the reaction is carried out in the presence of zinc oxide.

References Cited in the file of this patent
UNITED STATES PATENTS

| 2,451,174 | Reuter | Oct. 12, 1948 |
| 2,514,185 | Eberly | July 4, 1950 |